United States Patent
Gossweiler

(10) Patent No.: US 7,458,390 B2
(45) Date of Patent: Dec. 2, 2008

(54) BREATH CONTROLLED AIR INLET FOR BLOWER

(75) Inventor: Otto Gossweiler, Effretikon (CH)

(73) Assignee: TVI Corporation, Glenn Dale, MD (US)

( * ) Notice: Subject to any disclaimer, the term of this patent is extended or adjusted under 35 U.S.C. 154(b) by 189 days.

(21) Appl. No.: 11/312,585

(22) Filed: Dec. 21, 2005

(65) Prior Publication Data

US 2007/0137712 A1    Jun. 21, 2007

(51) Int. Cl.
*F16K 31/126* (2006.01)

(52) U.S. Cl. ............. 137/494; 128/204.26; 137/601.09; 137/906; 137/907

(58) Field of Classification Search ................. 137/494, 137/510, 505.46, 505.47, 906, 907, 601.09; 128/204.26, 205.25
See application file for complete search history.

(56) References Cited

U.S. PATENT DOCUMENTS

| 865,996 | A | | 9/1907 | Catt |
|---|---|---|---|---|
| 911,249 | A | * | 2/1909 | Lulli ..................... 137/505.46 |
| 1,105,127 | A | | 7/1914 | Drager |
| 1,169,996 | A | | 2/1916 | Prindle |
| 1,816,431 | A | * | 7/1931 | Helf ..................... 137/506 |
| 3,018,776 | A | | 1/1962 | Saitta |
| 3,044,464 | A | | 7/1962 | Gray |
| 3,232,310 | A | * | 2/1966 | Treder ..................... 137/494 |
| 3,715,032 | A | | 2/1973 | Nicko |
| 3,731,717 | A | | 5/1973 | Potash |
| 3,766,933 | A | * | 10/1973 | Nicholson, Jr. .......... 137/116.3 |
| 3,792,714 | A | * | 2/1974 | Miller ..................... 137/494 |
| 3,852,196 | A | | 12/1974 | Szpur |
| 3,990,439 | A | | 11/1976 | Klinger |
| 4,243,029 | A | | 1/1981 | Apple |
| 4,257,415 | A | | 3/1981 | Rubin |
| 4,384,576 | A | | 5/1983 | Farmer |
| 4,402,316 | A | | 9/1983 | Gadberry |
| 4,433,684 | A | | 2/1984 | Sarnoff |
| 4,493,614 | A | | 1/1985 | Chu |
| 4,513,741 | A | | 4/1985 | Demi |
| 4,529,514 | A | | 7/1985 | Gruett |
| 4,574,799 | A | | 3/1986 | Warnke |
| 4,682,993 | A | | 7/1987 | Todd |
| 4,823,785 | A | | 4/1989 | Mancosu |

(Continued)

FOREIGN PATENT DOCUMENTS

DE        4241033 A1     6/1994

*Primary Examiner*—Stephen M Hepperle
(74) *Attorney, Agent, or Firm*—Whiteford, Taylor & Preston LLP; Jeffrey C. Maynard; R. Christopher Rueppell

(57) ABSTRACT

The present invention relates to a breath controlled air inlet valve for controlling a flow of air supplied to a wearer of a facemask, the valve permitting the flow of air when a wearer breathes in and restricting the flow of air when the wearer breathes out. The valve includes an inlet, an outlet, one or more pivotable shutters, and a shutter articulating mechanism for articulating the one or more shutters between an open state and a closed state. The shutter articulation mechanism actuates in response to the respiration of the wearer. The valve also enables a positive pressure to be maintained within the facemask by permitting an amount of air to flow around the one or more shutters when the one or more shutters are in the closed state.

21 Claims, 7 Drawing Sheets

U.S. PATENT DOCUMENTS

| | | | |
|---|---|---|---|
| 4,841,963 A | 6/1989 | Vandeputte | |
| 4,915,106 A | 4/1990 | Aulgur | |
| 4,924,861 A | 5/1990 | Kiske | |
| 4,936,298 A | 6/1990 | Nishina | |
| 4,961,420 A | 10/1990 | Cappa | |
| 4,971,051 A | 11/1990 | Toffolon | |
| 5,036,846 A | 8/1991 | Aulgur | |
| 5,065,745 A | 11/1991 | Meier | |
| 5,117,855 A * | 6/1992 | Goldsmith | 137/907 |
| 5,209,226 A | 5/1993 | Goodley | |
| 5,235,972 A | 8/1993 | Strong | |
| 5,238,453 A * | 8/1993 | Heil | 137/601.09 |
| 5,409,035 A * | 4/1995 | Scott et al. | 137/510 |
| 5,427,091 A | 6/1995 | Phillips | |
| 5,503,147 A | 4/1996 | Bertheau | |
| 5,690,102 A | 11/1997 | Bertheau | |
| 5,914,037 A | 6/1999 | Yen | |
| 6,039,045 A | 3/2000 | Bertheau | |
| 6,155,258 A | 12/2000 | Voege | |
| 6,214,074 B1 | 4/2001 | Silviera | |
| 6,269,811 B1 | 8/2001 | Duff | |
| 6,293,306 B1 * | 9/2001 | Brenes | 137/601.09 |
| 6,325,116 B1 | 12/2001 | Savage | |
| 6,615,828 B1 | 9/2003 | Petherbridge | |
| 6,796,304 B2 | 9/2004 | Odell | |
| 6,823,867 B2 | 11/2004 | Avery | |
| 6,834,650 B1 | 12/2004 | Fini | |
| 6,837,239 B2 | 1/2005 | Beizndtsson | |
| 7,101,412 B2 | 9/2006 | Gossweiler | |
| 2003/0005932 A1 | 1/2003 | Rydgren | |
| 2005/0051235 A1 | 3/2005 | Gossweiler | |
| 2005/0103343 A1 | 5/2005 | Gossweiler | |
| 2005/0126572 A1 | 6/2005 | Gossweiler | |
| 2005/0263155 A1 | 12/2005 | Gossweiler | |
| 2006/0048782 A1 | 3/2006 | Gossweiler | |

* cited by examiner

BREATH CONTROLLED AIR INLET FOR BLOWER

BACKGROUND OF THE INVENTION

1. Field of the Invention

The present invention relates to a breath controlled air inlet for a blower and, particularly, to a shutter-type valve that opens and closes as a result of pressure changes in a facemask due to a user breathing while wearing the facemask.

2. Background of the Technology

Powered air supply systems are known in the industry for supplying air under pressure to a facemask wearer. Such systems are beneficial by providing a constant supply of air to the wearer as well as reducing the work that the wearer must perform when breathing in the air. However, the known powered air systems constantly supply air to the wearer without distinguishing between inhaling and exhaling by the wearer. Consequently, exhaling while wearing the facemask is known to become laborious, because the wearer must constantly overcome positive pressure from the air supplied by the powered air supply system, thereby tiring or fatiguing the wearer.

There also exists in the art a valve used in conjunction with the powered air supply system for controlling an amount of air fed into the facemask. One particular type of valve is illustrated in FIGS. 1(a) and 1(b). The valve 1 includes a housing 2, diaphragm 3, a spring 4, and a seal 5. The valve 1 is connected to an air inlet tube 7 at a first or inlet end and a facemask 6 at a second or outlet end opposite the first or inlet end. The air inlet tube 7 is connected to a powered air supply system (not shown). FIG. 1(a) illustrates a state wherein the wearer is not inhaling or breathing in air. Although the powered air supply system continuously creates a positive pressure and, hence, continues to supply air to the facemask 6, the diaphragm 3 remains in contact with the seal 5 because of a spring force provided by the spring 4. Once the wearer begins to breath in, pressure within the facemask 6 lowers, causing the diaphragm 3 to deflect, which compresses the spring 4, as illustrated in FIG. 1(b). As a result, air from the air inlet tube 7 flows through a gap created between the deflected diaphragm 3 and the seal 5 and into the facemask 6, as illustrated by arrows 8 in FIG. 1(b).

However, the known valve 1 requires a large diaphragm 3 and corresponding housing 2 in order to permit sufficient airflow into the facemask 6 because of the relatively small deflection of the diaphragm 3. Consequently, the size of the valve 1 is large, which hinders movement of the wearer's head and obstructs the wearer's vision. Moreover, new powered air supply systems must supply larger flowrates of air to the wearer, which further increases the size of the valve 1 and, correspondingly, the housing 2 of the valve 1. For example, many of the older powered air supply systems deliver approximately 120 liters per minute to the wearer. However, the new powered air supply systems must deliver approximately 300 liters per minute. Thus, the increase in size of the valve 1 creates an even larger obstruction to the wearer's vision. Therefore, the valve 1 is not capable of satisfactorily facilitating the increased flowrates required by the new powered air supply systems. As a result, there is a need in the art for a compact valve accompanying a powered air supply system that is capable of satisfactorily facilitating the increased flowrates required by the new powered air supply systems and that does not obstruct the wearer's field of view.

There also exists a powered air supply system having a blower operable at one speed when the wearer is inhaling and operable at a reduced speed at other times. However, the blowers of such powered air supply systems suffer from a lag or delay between the instant the wearer inhales and the instant the blower is capable of supplying air at a higher flowrate. During the lag period, an under-pressure situation occurs in the facemask, forcing the wearer to expend more effort to breathe. Over time, the extra effort causes fatigue to the wearer. The blowers of such systems also include a lag when transitioning to a lower speed when the wearer exhales. As a result, the wearer must exert extra effort to exhale against the pressure associated with the higher air supply level, which causes fatigue to the wearer.

Such systems also include lags associated with speeding up or slowing down a column of air traveling through a hose connecting the facemask and the blower. As a result, there is a need in the art for a compact valve that reacts quickly to inhaling and exhaling by a wearer and facilitates increasing flowrates required by new powered air supply systems as well as a valve that does not obstruct the wearer's vision or hinder movement of the wearer's head.

SUMMARY OF THE INVENTION

The present invention overcomes the above-described problems in the art, as well as others, by providing a small, compact valve for a powered air supply system that includes one or more articulating shutters moveable between an open state and a closed state. The one or more shutters adjust a flowrate of air into the facemask based on the needs of the wearer. At other times, such as when the wearer exhales, the one or more shutters return to the closed state to prohibit airflow into the facemask. Alternately, when the one or more shutters are in the closed state, a small flowrate of air is permitted through the valve in order to maintain a positive pressure inside the facemask. A shutter articulation mechanism actuates opening and closing of the shutters in response to the respiration rate of the wearer.

According to one aspect of the present invention, the valve includes a valve body, which forms an inlet at a first end and an outlet at a second end. One or more shutters are disposed within the valve body between the inlet and the outlet and are positionable between the closed state and the open state. The shutter articulating mechanism articulates the one or more shutters between the open and closed states by sensing pressure changes in the outlet of the valve. Further, the shutter articulating mechanism articulates the one or more shutters in unison in response to the pressure in the valve outlet. The valve also includes gaps formed between an interior surface of the valve body and the one or more shutters. The gaps permit air to flow past the one or more shutters when positioned in the closed state so that a positive pressure is maintained in an interior of the facemask worn by the wearer.

According to another aspect of the present invention, the shutter articulating mechanism includes a diaphragm contained within a diaphragm housing coupled to the one or more shutters. The diaphragm partitions an interior of the diaphragm housing into a first portion and a second portion. The first portion of the diaphragm housing interior communicates with the valve outlet so that any pressure change in the outlet also occurs in the first portion of the diaphragm housing interior. The second portion of the diaphragm housing interior communicates with the exterior of the valve via an ambient air vent. The diaphragm deflects from a rest position when the pressure inside the valve outlet drops below a predetermined pressure, causing the one or more shutters to articulate from the closed state to the open state. Alternately, the diaphragm returns to the rest position when the pressure in the valve outlet rises above the predetermined pressure, causing the one or more shutters to return to the closed state.

The shutter articulating mechanism further includes a spring disposed in the first portion of the interior of the diaphragm housing that provides a restoring force to return the diaphragm to the rest position when the pressure inside the valve outlet falls below the predetermined pressure. The spring is retained at a first end within a groove formed in a diaphragm ring disposed in the first portion of the diaphragm housing interior and secured to a surface of the diaphragm. A second end of spring abuts an interior surface of the diaphragm housing. Hence, when the pressure in the valve outlet falls below the predetermined pressure, the diaphragm is displaced from the rest position causing the spring to compress. Alternately, when the pressure in the valve outlet rises above the predetermined pressure, the spring expands, returning the diaphragm to the rest position.

The diaphragm ring includes connecting rods that extend through slots formed in the diaphragm housing. The slots also provide communication between the valve outlet and the first portion of the diaphragm housing interior. A push rod extends between each connecting rod and the one or more shutters. Therefore, deflection of the diaphragm within the diaphragm housing is transferred to the one or more shutters via the connecting rods and the push rods to articulate the one or more shutters between the open state and the closed state.

According to a further aspect of the present invention, the diaphragm housing encircles the valve outlet to form a donut shape. The valve also includes a ring nut disposed on the valve body proximate to the valve outlet for securing the valve to a mating fitting included in a facemask. The ring nut includes an outer threaded surface and is rotatably secured on an outer surface of the valve body.

According to a further aspect of the present invention, the valve forms a component of a powered air supply system for providing a supply of air to the wearer of a facemask. Air is supplied to the valve inlet via a hose secured to an outer surface of the valve body. An opposite end of the hose is attached to a powered blower. The valve is secured to a facemask so that the valve outlet is in communication with an interior of the facemask. The respiration of the wearer of the facemask causes the pressure within the valve outlet to rise and fall relative to the predetermined pressure so that the one or more shutters of the valve articulate between the open and closed states. Accordingly, the valve is controlled by the respiration of the wearer.

Additional aspects, advantages, and novel features of the invention will be better understood as set forth in the following description and accompanying drawings and will also become apparent to those skilled in the art upon examination of the following or upon learning by practice of the invention.

BRIEF DESCRIPTION OF THE FIGURES

The features of the invention will be more readily understood with reference to the following description and the attached drawings, wherein.

DETAILED DESCRIPTION OF PREFERRED EMBODIMENT

Figure 1A:
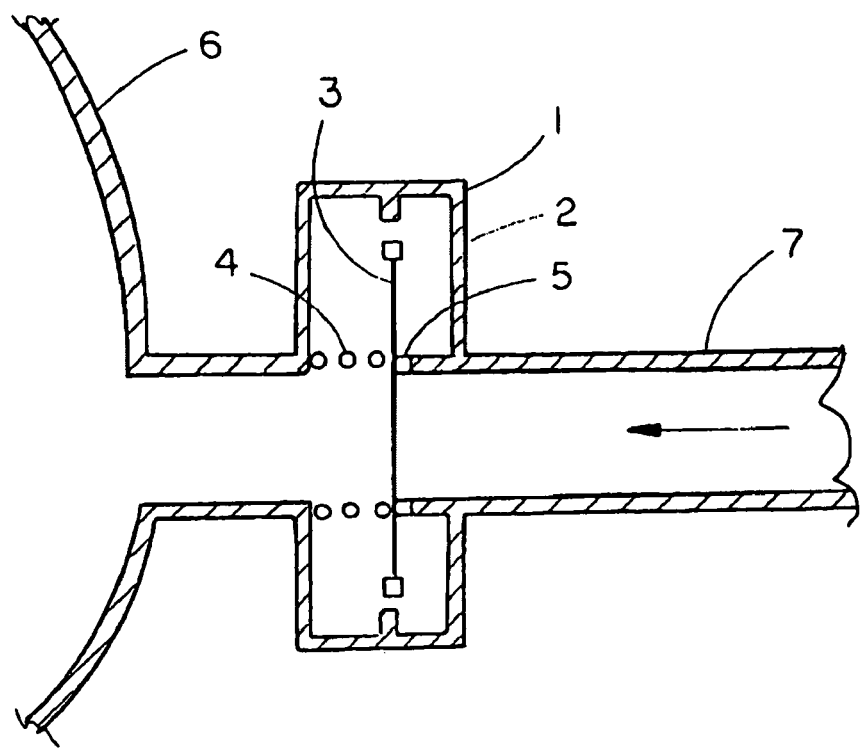
FIGS. 1(a) and 1(b) show a closed state and an open state, respectively, of a related art valve.
Figure 1B:
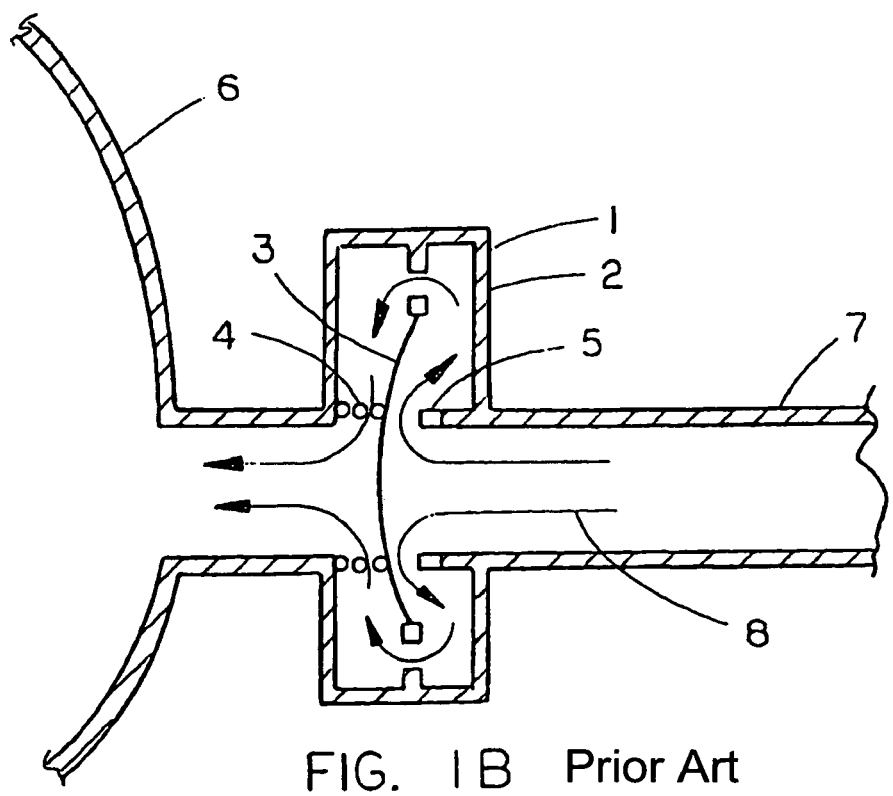
Figure 2:
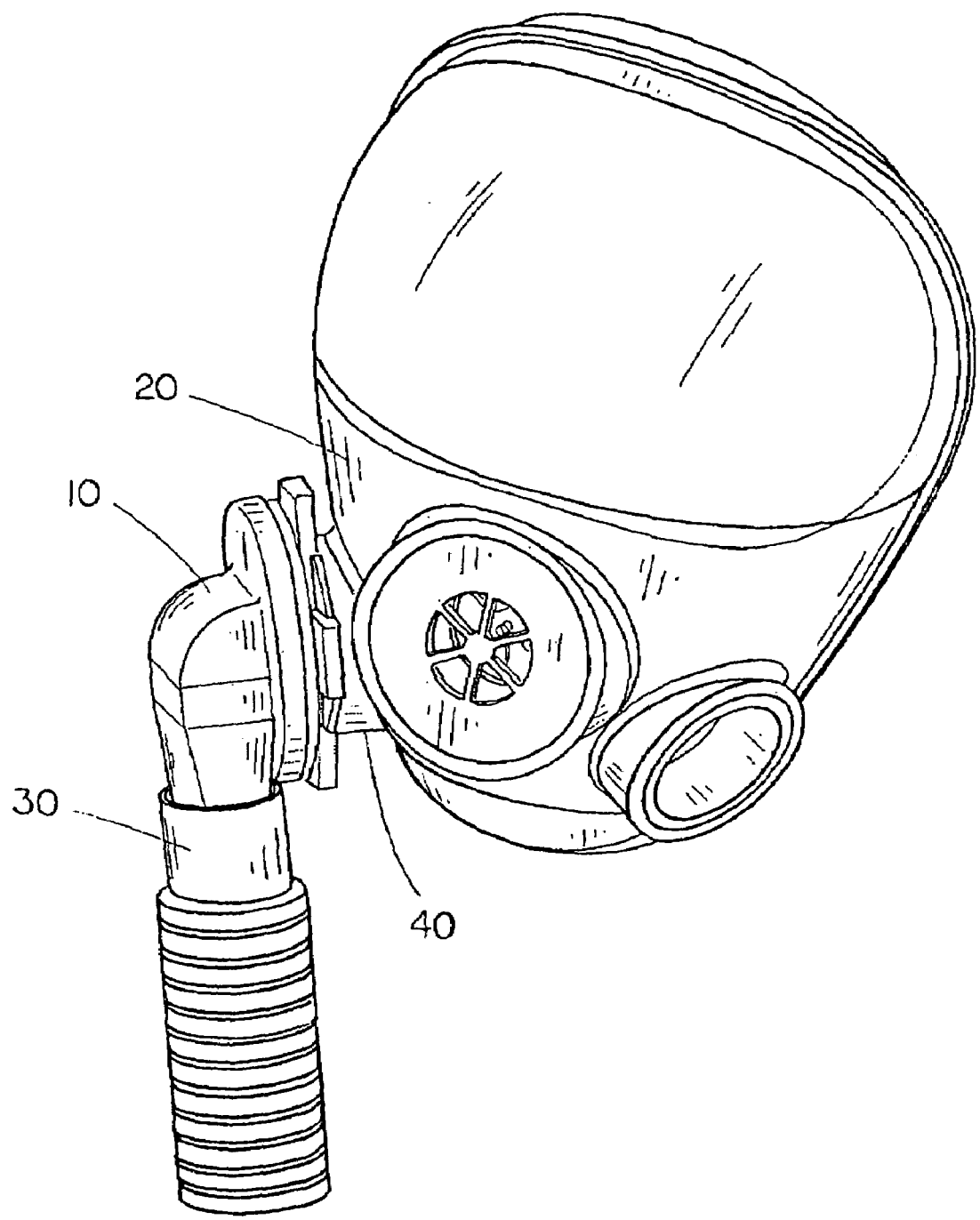
FIG. 2 shows a flow control valve according to an embodiment of the present invention disposed between a facemask and an air supply hose.

The present invention relates to a valve for use with a powered air supply system for supplying air, for example, to a facemask worn by a wearer. FIG. 2 illustrates a valve 10 connected to a facemask 20 at a first end and a hose 30 at a second end. The valve 10 is threadably connected to a female port 40 on the facemask 20.

Figure 3:
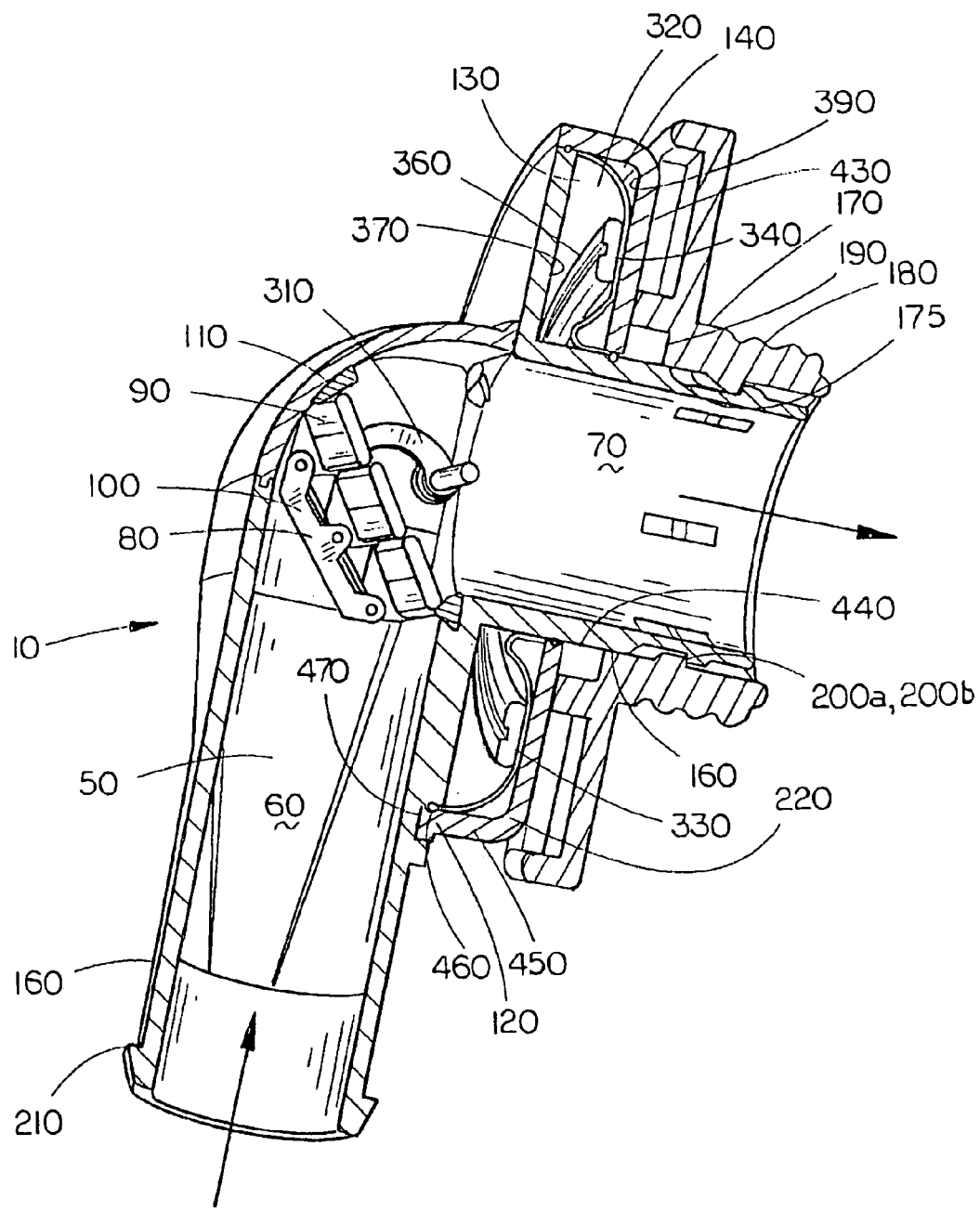
FIG. 3 is a cross-sectional view of the flow control valve shown in FIG. 2, wherein the plurality of shutters within the valve are in a closed state.
Figure 4:
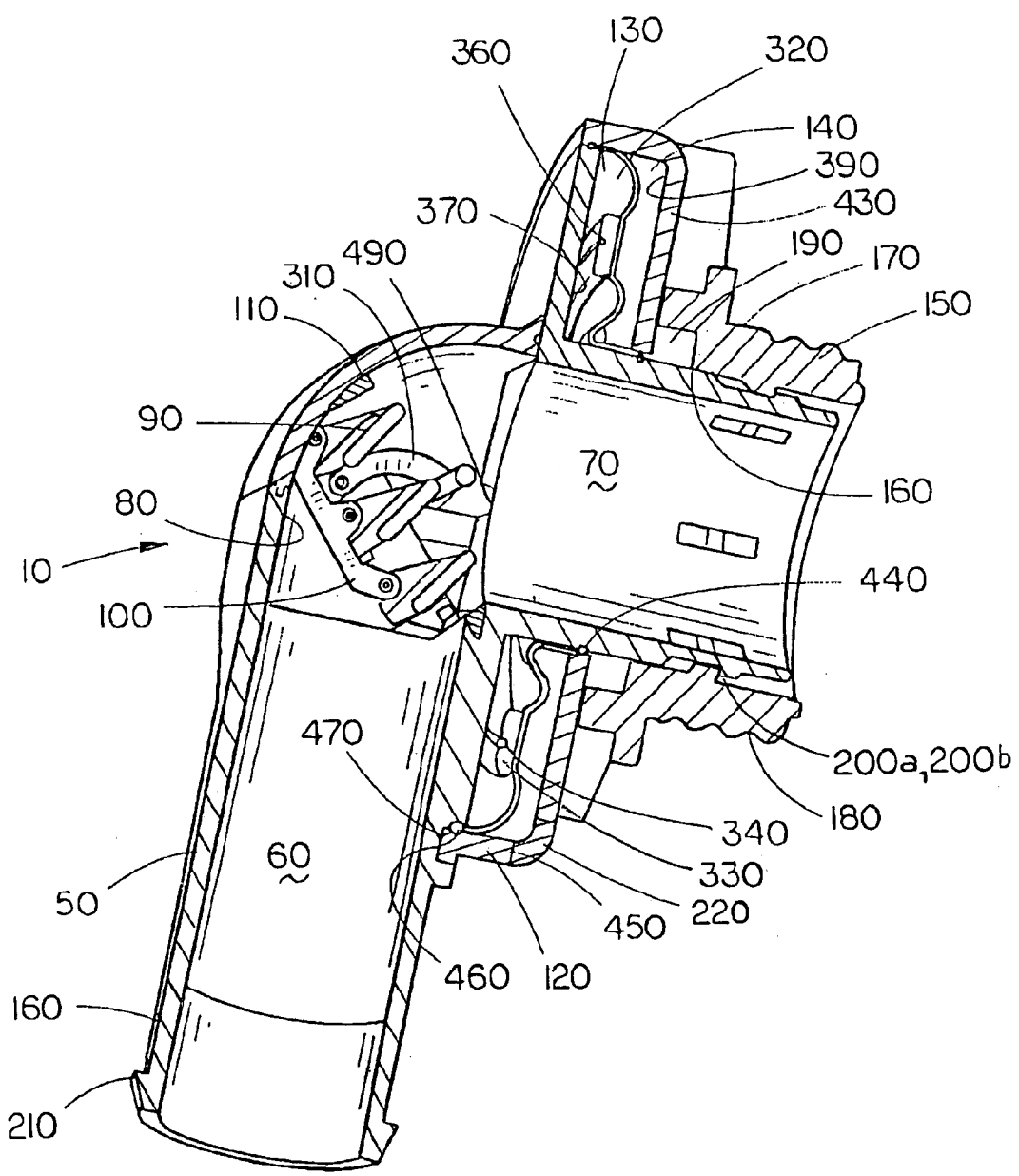
FIG. 4 is a cross-sectional view of the flow control valve shown in FIG. 2, wherein the plurality of shutters within the valve are in an open state.
Figure 5A:
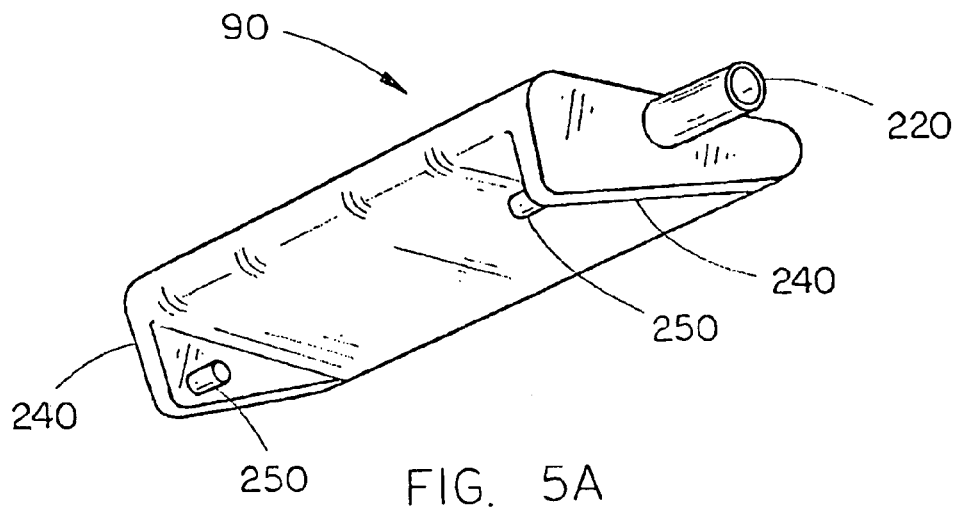
FIG. 5(a) is perspective view of a shutter in accordance with an embodiment of the present invention.
Figure 5B:
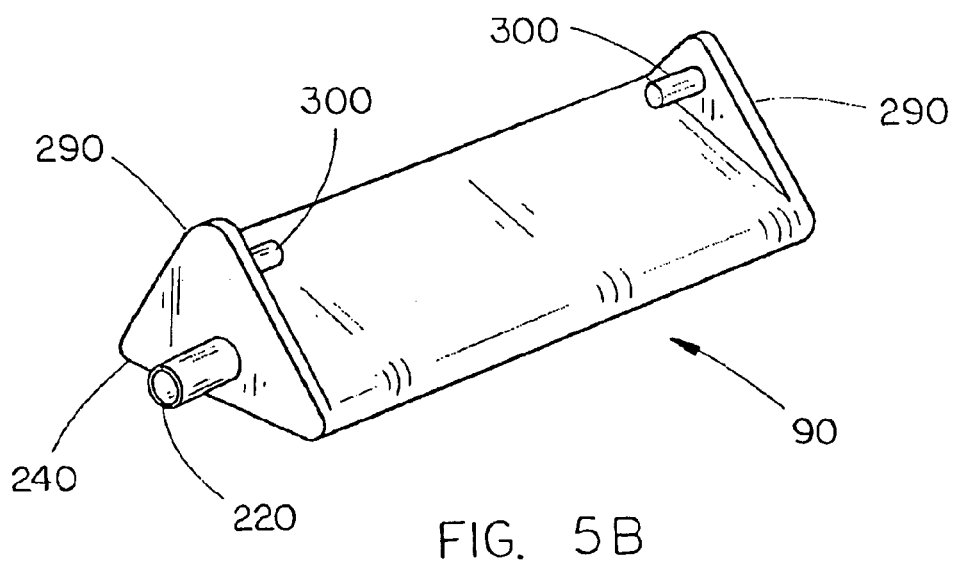
FIG. 5(b) is a perspective view of a shutter having extensions with pins for actuating the shutter assembly between the closed state and the open state.
Figure 6:
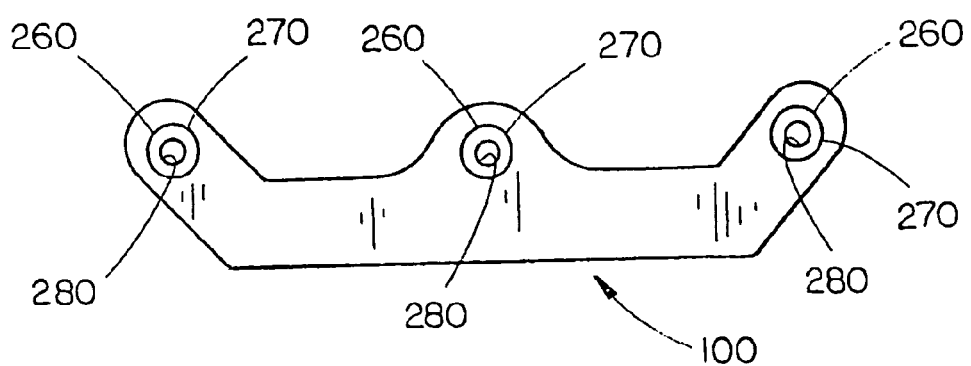
FIG. 6 is a side view of a link in accordance with an embodiment of the present invention.
Figure 7:
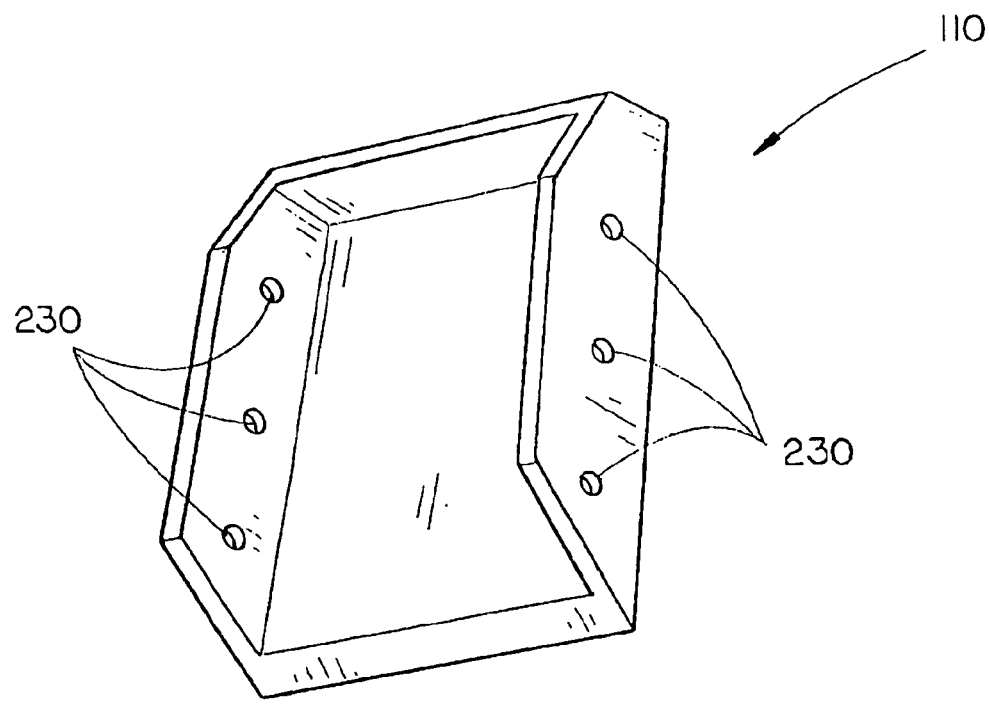
FIG. 7 is a perspective view of a frame of a shutter assembly in accordance with an embodiment of the present invention.

Referring to FIGS. 3 and 4, the valve 10 includes a housing 50 having an inlet 60 and an outlet 70. Disposed within the housing 50 between the inlet 60 and the outlet 70 is a shutter assembly 80 that includes one or more shutters 90 that are positionable between an open state and a closed state, links 100, and a frame 110. The links 100 interconnect the shutters 90 so that the shutters 90 open and close in unison. The valve 10 further includes a diaphragm housing 120 having an interior, which is divided into a first portion 130 and a second portion 140 by a diaphragm 320. The valve 10 also includes a ring nut 150 rotatably secured on the outer surface 160 of the housing 50 near the outlet 70. An outer surface 170 of the ring nut 150 includes threads 180, such as an RD40 thread interface, for threadably connecting the ring nut 150 to the female port 40 of the facemask 20. The ring nut 150 also includes a rubber seal 190 on an inner surface, which is in contact with the outer surface 160 of the housing 50. The rubber seal 190 aids in preventing air from escaping from the valve 10 and, according to one embodiment, is formed from butyl rubber. Further, the ring nut 150 is retained on the housing 50 by slideably engaging lips 200a and 200b. The lip 200a is integrally formed on the ring nut 150 while the lip 200b is formed on the housing 50. The outer surface 160 of the housing 50 also includes a lip 210 proximate to the inlet 60 for removably engaging the hose 30. In one embodiment, the valve 10 is L-shaped, although it is within the scope of the invention for the valve 10 to have any shape, such as straight or curved.

FIGS. 5(a), 5(b), 6, and 7 illustrate the shutters 90, link 100, and the frame 110, respectively. Each shutter 90 includes pins 220, extending from opposing ends thereof. Each pin 220 is slideably inserted into a corresponding opening 230 formed in the frame 110 so that the shutters 90 are pivotable therein. An extension 240 is formed on opposing ends of the shutters 90. An inward facing pin 250 is formed on each extension 240. The pins 250 are retained in respective openings 260 formed in the links 100. In one embodiment, the openings 260 include a metal bearing 270, formed from stainless steel, for example, and the pins 250 are journaled in an inner race 280 of the metal bearings 270. The metal bearings 270 are inserted into the openings 260, for example, by press fitting or insert molding, so that the metal bearings 270 are fixedly mounted to the links 100. Further, at least one shutter 90 includes extensions 290 formed on opposite ends of the shutter 90. Each extension 290 includes a pin 300 for engaging a push rod 310 (shown in FIG. 9), which is described below.

In one embodiment of the present invention, the housing 50, the shutters 90, the links 100 (except for the metal bearings 270), and the frame 110 are manufactured by an injection molding process and are formed, for example, from Noryl® manufactured by the General Electric Company Corporation, 1 River Road, Schenectady, N.Y. 12345. However, it is within the scope of the present invention to use any suitable manufacturing technique now in existence or hereafter created. Further, the housing 50, shutters 90, the links 100, and the frame 110 may be formed from any suitable material, such as fiber-epoxy composite materials, metals, or other polymeric materials.

Again referring to FIGS. 3 and 4, the diaphragm 320 is housed within the diaphragm housing 120. The diaphragm 320 is formed from a CBRN (Chemical, Biological, Radiological, or Nuclear) proven material, such as butyl rubber, EPDM (ethylene propylene diene monomer), or any other suitable material. The diaphragm 320 divides the interior of the diaphragm housing 110 into the first portion 130 and the second portion 140. A diaphragm ring 330 having a groove 340 formed in an outer surface thereof is secured to a surface 350 of the diaphragm 320, such as with an adhesive. The diaphragm ring 330 is formed from Noryl®, for example. A spring 360, such as a coil spring, is also disposed in the first portion 130 of the diaphragm housing 120 between a first inner wall 370 and the diaphragm ring 330. A first end of the spring 360 is retained within the groove 340 of the diaphragm ring 330 and a second end of the spring 360 abuts the first inner wall 370. The spring 360 provides a restoring force for returning and holding the diaphragm 320 in a rest position, as shown in FIG. 3. In the rest position, an outer surface 380 of the diaphragm 320 contacts a second inner wall 390 of the diaphragm housing 120. The diaphragm housing 120 also includes an ambient air vent 220, which provides communication between the interior of the diaphragm housing 120 and the exterior of the valve 10. The ambient air vent 220 permits ambient air to enter and exit the second portion 140 of the diaphragm housing 120 to prevent formation of a vacuum when the diaphragm 320 articulates from the rest position to a displaced position, as shown in FIG. 4.

In one embodiment, opposing edges of the diaphragm 320 are sandwiched between mating ends 440 and 450 of a circular member 430 and the housing 50, as shown in FIGS. 3 and 4. However, it is within the scope of the present invention that the diaphragm 320 be secured within the diaphragm housing 120 in any suitable manner, such as with an adhesive or by ultrasonic welding. Further, to prevent rotation about the circular member 430 relative to the housing 50, the circular member 430 includes an extension 460 that fits into a notch 470 formed in the housing 50. The extension 460 and the notch 470 lockingly engage each other to prevent rotation of the circular member 430 relative to the housing 50.

Figure 8:
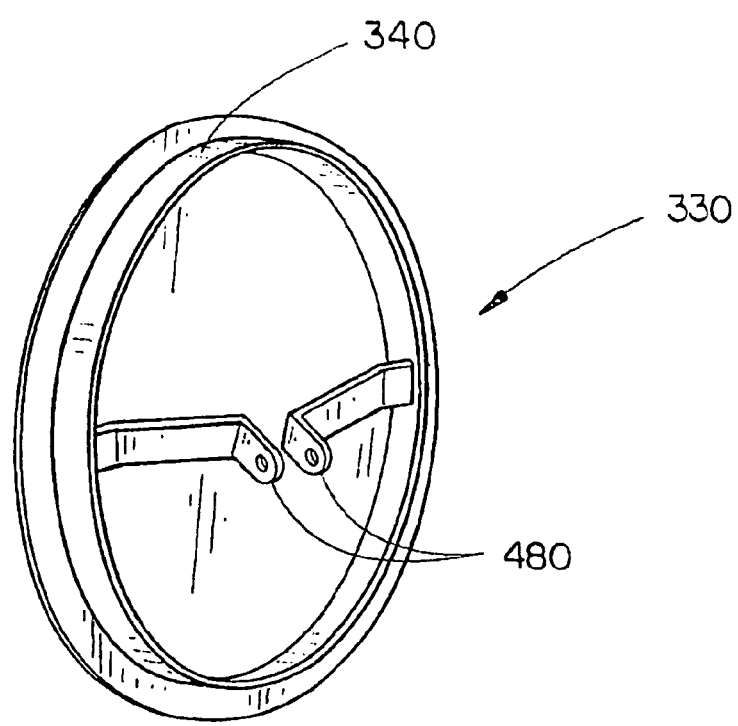
FIG. 8 is a perspective view of a diaphragm ring in accordance with an embodiment of the present invention.
Figure 9:
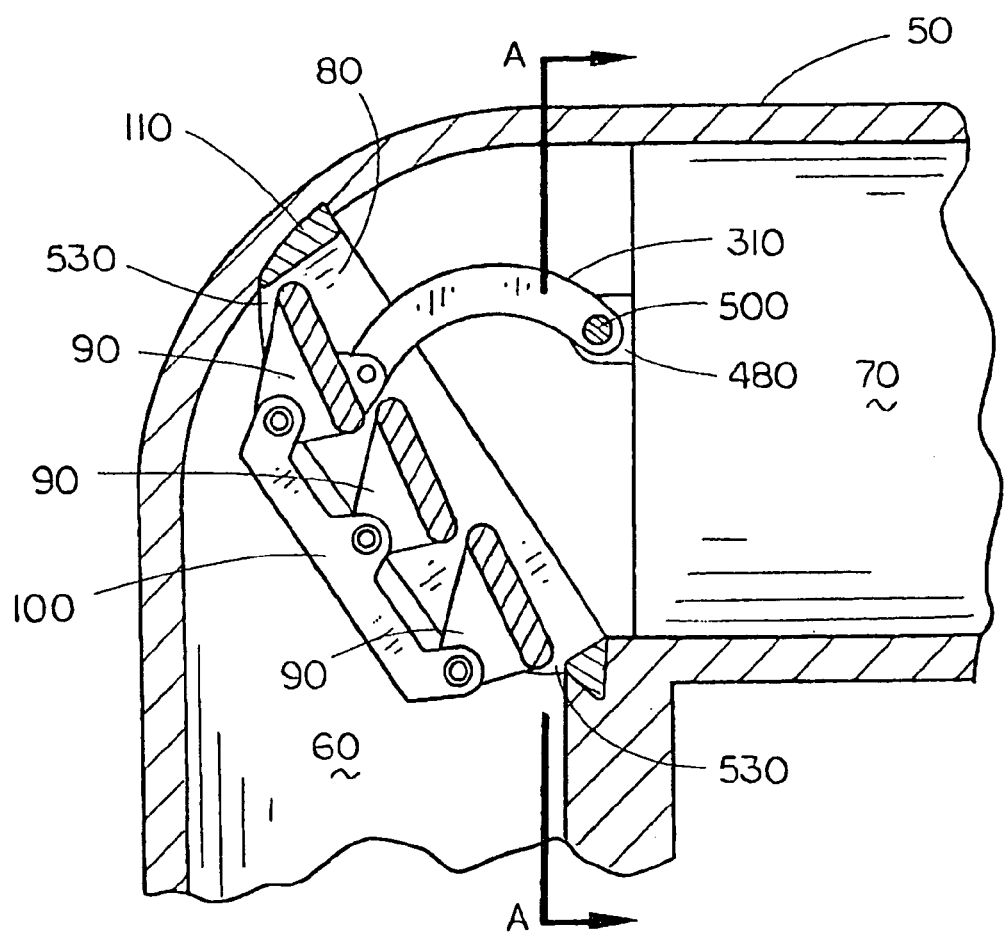
FIG. 9 is an enlarged view of a portion of the flow control valve shown in FIG. 3.
Figure 10:
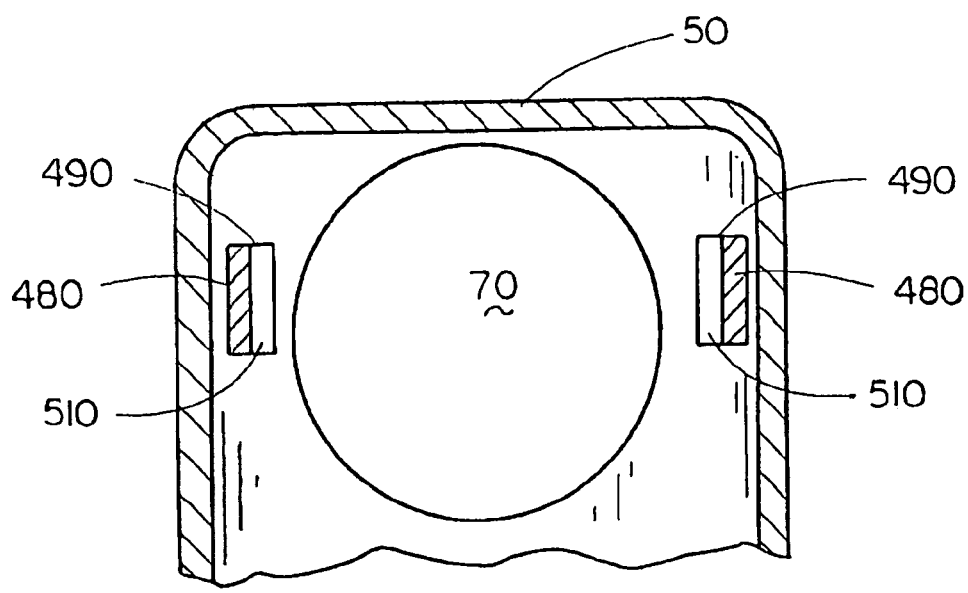
FIG. 10 is a partial cross-sectional view taken along line A-A shown in FIG. 9.

Referring to FIGS. 8, 9, and 10, the diaphragm ring 330 includes connecting rods 480 that extend through slots 490 formed in the housing 50. A push rod 310 pivotably attaches between each connecting rod 480 and each extension 290 of the shutter 90. Accordingly, in one embodiment, two push rods 310 are included within the valve 10 to translate movement of the diaphragm 320 and diaphragm ring 330 to actuate the shutter assembly 80. An axle 500 extends between inner facing surfaces of the push rods 310. The axle 500 synchronizes movement of the push rods 310 so that the push rods 310 operate in unison. Moreover, the axle 500 prevents the diaphragm 320, diaphragm ring 330, and the shutter assembly 80 from jamming due to unequal extension or retraction of the connecting rods 480 during operation of the valve 10.

The slots 490 also include a passageway 510 adjacent to the connecting rod 480. The passageways 510 provide communication between the first portion 130 of the interior of the diaphragm housing 120 and the outlet 70 of the valve 10. Therefore, when a wearer inhales, a pressure within the facemask 20 and the outlet 70 of the valve 10 is reduced. The reduced pressure also exists in the first portion 130 of the diaphragm housing 120 because of the communication provided therebetween by the passageways 510. The reduced pressure acts over an entire surface 520 of the diaphragm 320, causing the diaphragm 320 to deflect, as show in FIG. 4. The diaphragm ring 330 and the connecting rods 480 move accordingly, compressing the spring 360. As a result, the push rods 310 open the shutters 90. Once the shutters 90 open, air from a powered air blower (not shown) is conducted through the valve 10 and into the facemask 20 for inhalation by the wearer.

The deflection of the diaphragm 320 within the diaphragm housing 120 may vary depending upon the pressure reduction in the outlet 70 of the valve 10, i.e., the forcefulness of the wearer's breath. Consequently, as the deflection of the diaphragm 320 increases, the shutters 90 undergo a larger angular displacement. As such, a larger flowrate of air passes through the valve 10, and, hence, a greater volume of air is permitted into the facemask 20. A smaller angular displacement of the shutters 90 results in a lower flowrate of air through the valve 10 and, hence, a smaller volume of air into the facemask 20. According to one embodiment of the present invention, the diaphragm 320 deflects when a relative pressure in the outlet 70 of the valve 10 is in the range of 1 and 8.8 millibars. However, it is within the scope of the invention to have the shutters 90 open and close at any pressure. The pressure at which diaphragm 320 deflects is accomplished, for example, by changing a biasing rate of the spring 360.

When the wearer stops inhaling, the pressure inside the facemask 20 and outlet 70 equalizes with the pressure existing in the inlet 60 of the valve 10. Consequently, the spring 360 returns the diaphragm 320 to the rest position, causing the shutters 90 to close. Accordingly, the valve 10 reacts rapidly to respiration, i.e., inhaling and exhaling, of the wearer.

The valve 10 also includes gaps 530 formed between an inner surface of the housing 50 and the uppermost and lowermost shutters 90. The gaps 530 permit an amount of air supplied by the blower to pass around the shutters 90 and enter the facemask 20 so that a positive pressure always exists inside the facemask 20.

Therefore, the valve 10 is small and compact allowing unfettered movement of the wearer's head and does not interfere with the wearer's field of view. The valve 10 also rapidly responds to inhaling and exhaling by the facemask wearer, dramatically reducing or eliminating fatigue to the wearer.

While there has been described what are at present considered to be preferred embodiments of the present invention, it will be understood that various modifications may be made thereto, and it is intended that the appended claims cover all such modifications as fall within the true spirit and scope of the invention. Such modifications will be apparent to those skilled in the art.

What is claimed is:

1. A valve for a power air supply system comprising:
   a valve body having an inlet and an outlet and a diaphragm housing partitioned into a first interior portion and a second interior portion by a diaphragm deflectable between a first position and a second position, wherein the first interior portion communicates with the outlet of the valve body, and wherein the second interior portion communicates with the exterior of the valve body;

a spring disposed within the diaphragm housing between a surface of the diaphragm and an interior wall of the diaphragm housing for biasing the diaphragm toward the first position when the pressure inside the outlet is above a predetermined pressure; and a diaphragm ring secured to the diaphragm, the diaphragm ring including a groove and at least one connecting rod, wherein a first end of the spring engages the groove of the diaphragm ring and a second end of the spring abuts an interior wall of the diaphragm housing, and wherein the deflection of the diaphragm promotes the at least one connecting rod, that extends between the diaphragm and at least one shutter disposed in the valve body between the inlet and the outlet, to articulate the at least one shutter between a closed state and an open state in response to a change in pressure within the outlet.

2. The valve according to claim 1, wherein at least one gap is defined between the at least one shutter and an interior surface of the valve body to provide communication between the inlet and the outlet when the at least one shutter is in the closed state.

3. The valve according to claim 1, wherein the at least one shutter is a plurality of interconnected shutters that articulate in unison.

4. The valve according to claim 3, wherein the plurality of interconnected shutters include at least one link pivotably attached to the plurality of interconnected shutters.

5. The valve according to claim 1, wherein the shutter articulating mechanism further comprises a spring for biasing the diaphragm in the first position when the pressure inside the outlet is above the predetermined pressure.

6. The valve according to claim 1, wherein the spring is disposed in the first interior portion of the diaphragm housing.

7. The valve according to claim 1, wherein the diaphragm housing encircles a portion of the valve body forming the outlet.

8. A valve for a power air supply system comprising:
a valve body having an inlet and an outlet;
a shutter assembly disposed in the valve body between the inlet and the outlet, the shutter assembly including at least one link pivotably attached to a plurality of shutters pivotable in a frame member, wherein at least one gap is defined between the plurality of shutters and the frame member and provides communication between the inlet and the outlet when the shutter assembly is in a closed state; and
a shutter articulating mechanism for articulating the shutter assembly between a the closed state and an open state in response to a change in pressure within the outlet.

9. The valve according to claim 8, wherein the at least one link includes a plurality of metal bearings, and wherein the plurality of shutters is pivotable within an inner race of the plurality of bearings.

10. The valve according to claim 8, wherein the shutter articulating mechanism comprises a diaphragm deflectable between a first position and a second position for articulating the shutter assembly between the closed state and the open state.

11. The valve according to claim 10, wherein the shutter articulating mechanism further comprises a spring for biasing the diaphragm in the first position when the pressure inside the outlet is above a predetermined pressure.

12. The valve according to claim 10, further comprising a diaphragm housing partitioned into a first interior portion and a second interior portion by the diaphragm, wherein the first interior portion communicates with the outlet of the valve and wherein the second interior portion communicates with the exterior of the valve.

13. The valve according to claim 12, wherein a spring is disposed within the diaphragm housing between a surface of the diaphragm and an interior wall of the diaphragm housing for biasing the diaphragm in the first position when the pressure inside the outlet is above a predetermined pressure.

14. The valve according to claim 13, wherein the spring is disposed in the first interior portion of the diaphragm housing.

15. The valve according to claim 13, further comprising a diaphragm ring secured to a surface of the diaphragm, the diaphragm ring comprising
a groove; and
at least one connecting rod,
wherein a first end of the spring engages the groove of the diaphragm ring and a second end of the spring abuts an interior wall of the diaphragm housing, and wherein the at least one connecting rod extends between the diaphragm and the shutter assembly for articulating the shutter assembly between the closed state and the open state.

16. The valve according to claim 12, wherein the diaphragm housing encircles a portion of the valve body forming the outlet.

17. A valve for a power air supply system comprising:
a valve body having an inlet and an outlet and a diaphragm housing partitioned into a first interior portion and a second interior portion by a diaphragm deflectable between a first position and a second position in response to a change in pressure within the outlet, wherein the first interior portion communicates with the outlet of the valve body, and wherein the second interior portion communicates with the exterior of the valve body;
a shutter assembly disposed in the valve body between the inlet and the outlet;
a spring disposed within the diaphragm housing between a surface of the diaphragm and an interior wall of the diaphragm housing for biasing the diaphragm toward the first position when the pressure inside the outlet is above the predetermined pressure; and
a diaphragm ring secured to the diaphragm, the diaphragm ring including a groove and at least one connecting rod extending between the diaphragm and said shutter assembly, wherein a first end of the spring engages the groove of the diaphragm ring and a second end of the spring abuts an interior wall of the diaphragm housing, and wherein the deflection of the diaphragm promotes the at least one connecting rod to articulate the shutter assembly between a closed state and an open state.

18. The valve according to claim 17, wherein at least one gap is defined between the shutter assembly and an interior surface of the valve body to provide communication between the inlet and the outlet when the shutter assembly is in the closed state.

19. The valve according to claim 17, wherein the shutter assembly comprises a plurality of interconnected shutters that articulate in unison.

20. The valve according to claim 19, wherein the plurality of interconnected shutters include at least one link pivotably attached to the plurality of interconnected shutters.

21. The valve according to claim 17, wherein the diaphragm housing encircles a portion of the valve body forming the outlet.

* * * * *

UNITED STATES PATENT AND TRADEMARK OFFICE
CERTIFICATE OF CORRECTION

PATENT NO. : 7,458,390 B2
APPLICATION NO. : 11/312585
DATED : December 2, 2008
INVENTOR(S) : Otto Gossweiler It is certified that error appears in the above-identified patent and that said Letters Patent is hereby corrected as shown below:

Column 7, line 39, cancel the text beginning with "8. A valve" to and ending "within the outlet." in column 7, line 51, and insert the following claim:

--8. A valve for a power air supply system comprising:
a valve body having an inlet and an outlet;
a shutter assembly disposed in the valve body between the inlet and the outlet, the shutter assembly including at least one link pivotably attached to a plurality of shutters pivotable in a frame member, wherein at least one gap is defined between the plurality of shutters and the frame member and provides communication between the inlet and the outlet when the shutter assembly is in a closed state; and
a shutter articulating mechanism for articulating the shutter assembly between the closed state and an open state in response to a change in pressure within the outlet--

Signed and Sealed this

Seventeenth Day of February, 2009

JOHN DOLL
*Acting Director of the United States Patent and Trademark Office*